United States Patent Office 3,149,861
Patented Sept. 22, 1964

3,149,861
TUBE COUPLING
Gunnar Larsson, Molkom, Sweden
Filed Sept. 29, 1959, Ser. No. 843,223
Claims priority, application Sweden, Oct. 1, 1958,
9,170/58
1 Claim. (Cl. 285—349)

This invention relates to couplings for connecting metal tubes or pipes, preferably of steel, and to methods for the application of couplings to said pipes. More particularly, the couplings are contemplated as including a metal sleeve which is adapted to overlay the pipes.

It is known to provide threads in a sleeve for cooperation with corresponding threads formed in the ends of the pipes. Due to the reduction in the thickness of the pipe at the root of the threads it is necessary to increase the overall thickness of the pipe in order to provide sufficient thickness at the root of the threads to furnish the required strength for the pipe. Furthermore, the cutting of the threads increases the manufacturing cost particularly when the threads are at the assembling site.

It has been proposed to avoid the above drawbacks associated with threads by thermally shrinking a smooth sleeve onto the ends of smooth pipes, but this gives unsatisfactory and unreliable end joints since the strength of the joint is completely dependent upon the friction established between the sleeve and the pipe ends.

It is an object of the invention to provide improvements in pipe joints of high strength at minimum cost.

It is a further object of the invention that the joint be formed with the ends of stock pipes which are not especially altered.

It is a still further object of the invention to set forth a method of forming a pipe joint which is simple to effect and which can be formed in situ with the ordinary ends of the pipes.

The coupling according to the invention may be applied to pipes to form straight, angular and branch joints, as well as to pipe connections of different kinds.

A number of practical embodiments of the invention are shown in conjunction with simple straight joints between two pipes in the accompanying drawings, in which.

Figure 1:
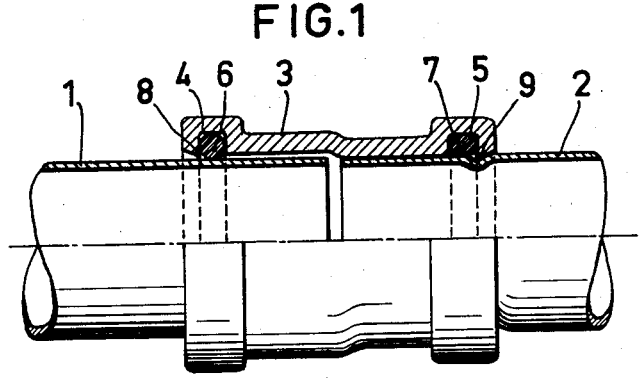
FIG. 1 is a longitudinal view, partly in section, of a first embodiment of the connecting device of the invention, the left part showing the parts before compression of the unit, and the right part after said compression.

In the embodiments described below the pipe point is assumed to form part of a pipe system where the joints must satisfy conditions of mechanical strength and fluid tightness under high pressure as well as upon resistance to corrosion.

The smooth ends 1 and 2 of the pipes which may be made of stainless steel are connected by a metal sleeve 3 which also may be made from steel. In the drawing the left tube end 1 with the associated sleeve half is shown prior to the joining operation and the right tube end 2 with its associated sleeve is shown after the joining operation.

In the embodiment according to FIG. 1 the sleeve originally has an interior diameter which is somewhat greater than that of the tube end 1 so that an annular play (annular clearance) is obtained between the inner wall of the sleeve and the outer wall of the tube end. On the inside of the sleeve there are provided annular grooves 4 and 5 at each end of the sleeve, and sealing rings 6 and 7 respectively are placed in said annular grooves with the outer periphery of the rings in contact with the bottom of the groove and the outer periphery of the pipe (see the ring 6). The rings may be made of Teflon. The groove wall of each annular groove bounding the annular groove adjacent the respective pipe ends is extended in the radial direction inwardly to form circumferentially extending sharp-pointed gripping edges 8 and 9 with substantially the same interior diameter as the sealing rings 6 and 7.

By radial compression of the wall surface of the sleeve, e.g., by means of cable joining tools with suitably designed jaws or chucks, the finished joint section shown in the right part of FIG. 1 is obtained. It will be seen that the gripping edge 9 has been pressed into the wall of the tube end 2 to deform the latter locally and that the sealing ring 7 and the sleeve portion behind the groove 5 has been made to firmly contact the tube wall. The material and/or dimensions of the sleeve are adjusted in such a manner that the deformation of the sleeve becomes permanent, while the corresponding data for properties of the tube 2 is such that a certain resilience is imparted to the tube after the pressing operation. Due to this the tension in the tube will increase the stability of the engagement by increased friction. Thus, the engagement will be both positive and provide locking, which makes the joint capable of resisting essentially the same load as the pipe itself.

Figure 2:
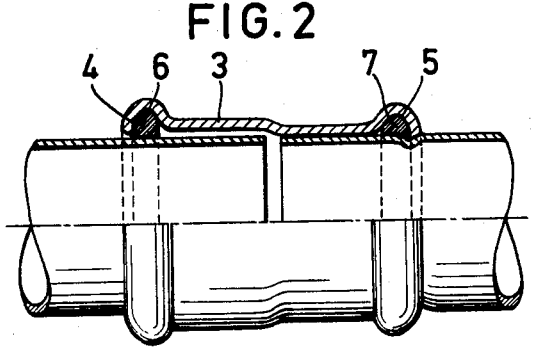
FIGS. 2, 3 and 4 are analogous views of a second, third and fourth embodiment, respectively, of the invention.

The embodiment shown in FIG. 2 is fundamentally the same as in FIG. 1. A marked difference, however, is that while the sleeve of FIG. 1 is produced by turning or casting, the sleeve of FIG. 2 is produced from a straight section of a pipe of standard dimension that is pressed into the shape shown in which external bulges are provided at the ends of the sleeve to form the grooves 4 and 5. In this embodiment also, another cross sectional form of the sealing rings 6 and 7 is shown.

Figure 3:
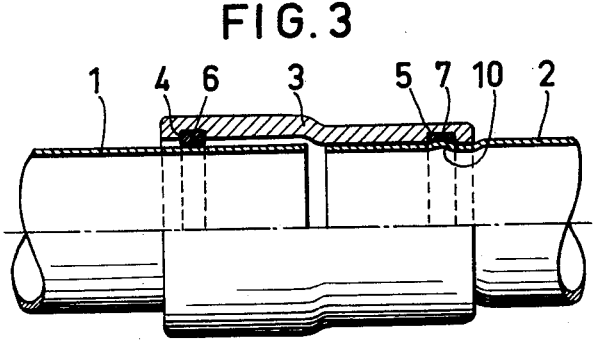

FIG. 3 shows a simple modification of the invention. There are no portions projecting from the inner wall of the sleeve. In lieu thereof the grooves 4 and 5 formed in the smooth wall of the sleeve contain the sealing rings 6 and 7 and are adapted to accommodate local beads formed in the pipe and as shown at 10. The beads are formed in the walls of the pipes 1 and 2 by the compression of the sleeve 3. Thus, two circumferentially extending gripping edges for each annular groove are obtained in this case, the gripping edges engaging tube 2 at both ends of bead 10.

Figure 4:
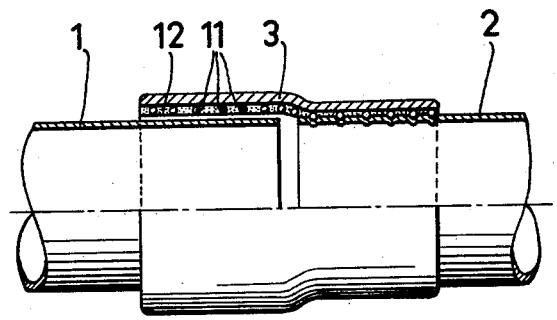

Still another application of the principle according to the invention is illustrated in FIG. 4. In the annular clearance between the sleeve 3 and the wall surfaces of the tube ends 1 and 2 hard particles, e.g., emery grains 11, are placed as gripping elements and baked into a sealing mass 12. At compression of the sleeve 3 the edges of the grains are pressed into the inner wall of the sleeve as well as into the outer wall of the tube, and at the same time sealing is obtained by the mass 12 between the sleeve and the tube.

Figure 5:
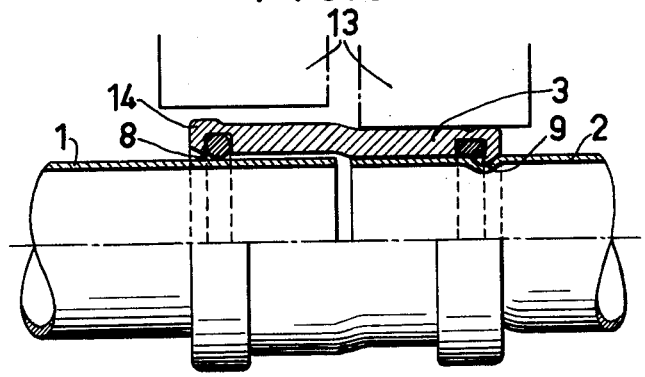
FIGS. 5 and 6 are analogous views of modified connection devices according to FIG. 1, for showing arrangements of mounting by means of a flat and stepped pressing tool, respectively.
Figure 6:
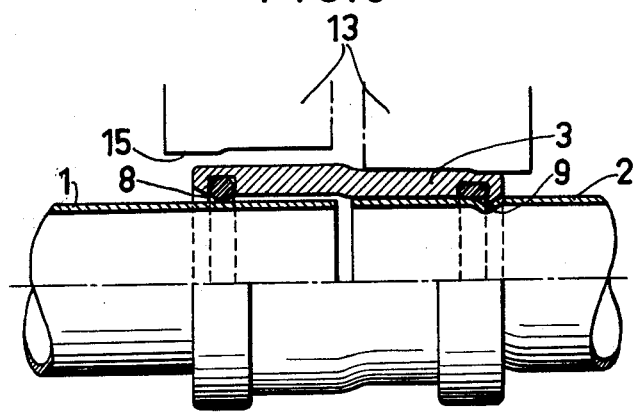

Finally, FIGS. 5 and 6 show modifications of the turned sleeve 3 in FIG. 1 together with schematically indicated pressing jaws. These modifications are cheaper from the viewpoint of manufacture due to the fact that the gripping edges 8 and 9 are made in the same plane as the rest of the inner wall surface of the sleeve 3. The lowering of the gripping edges 8, 9 relatively to the wall surface which is required for a stable engagement, is, in the embodiments according to FIGS. 5 and 6, obtained during the compression operation. For this purpose the sleeve in FIG. 5 is provided at its ends with an annular bead 14 (shown at the left in FIG. 5) which is placed on the annular element bounding the adjacent groove in such a manner that a deformation lowering the annular element and gripping edge 8 is obtained when uniform compression is applied to jaw 13 (as shown at the right in FIG. 6). In FIG. 6 the same deformation lowering the gripping edge 8 is obtained by placing the annular bead on the jaw 13 (at 15) while the outer wall of the sleeve 3 is smooth.

It is immediately understood that the above described applications of the principle according to the invention may be used not only with respect to straight joints but also to angular, branch and cross joints with corresponding design of the sleeve. Of course, the sleeve may be made for thread connection or the like at one end and for coupling at the other end as in any one of the above embodiments.

Modifications of the engagement elements are obvious to a person skilled in the art. For example, the portions extending from the inner wall of the sleeve may, instead of being annular, run in a coil and they may also be interrupted. The separate, elastic sealing may be varied in many ways both with regard to its place and its cross-section. Rubber, plastic, soft metal (zinc) are merely exemplary of sealing material. The contact of the middle portion of the inner wall of the sleeve shown in the figures (except FIG. 4) can, according to circumstances, be limited locally or omitted, which however results in a reduced bending strength of the joint.

Thus, according to the invention a joint or connection which is simple, inexpensive, effective and quickly made at the desired place while using smooth tubes is obtained.

What I claim is:

A pipe joint comprising a thin-walled sleeve element and two thin-walled rigid pipe elements substantially axially aligned and arranged in end-to-end relationship, said sleeve element encompassing the adjacent ends of said pipe elements, said sleeve element in its unassembled state having an internal diameter greater than the external diameter of the pipes, the sleeve being adapted thereby for encircling the rigid pipes, said sleeve having opposite ends and being provided with an annular recess adjacent each of said ends for surrounding a respective pipe when the latter are inserted into said sleeve, a sealing ring in each of said recesses and having an internal diameter which is smaller than the internal diameter of said sleeve, said sleeve including an annular engaging element adjacent each of said recesses and bounding the same, said annular engaging elements having sharp pointed gripping edges for engaging said pipes, said sleeve element upon radial compression locally deforming the pipes permanently receiving said edges therein to form grooves in said pipes, said sleeve compression further causing compression of said sealing rings to form a seal between the pipes and the sleeve at said rings and forcing said sleeve element into contact with the pipes in a zone inwardly of but adjacent the inner wall of said sealed recess whereby said sleeve connects the pipes together.

References Cited in the file of this patent

UNITED STATES PATENTS

| | | |
|---|---|---|
| 332,035 | Bagaley | Dec. 8, 1885 |
| 407,037 | Robertson | July 16, 1889 |
| 1,186,813 | McFerran | June 13, 1916 |
| 2,374,226 | Melsom | Apr. 24, 1945 |
| 2,477,676 | Woodling | Aug. 2, 1949 |
| 2,617,672 | Nichols | Nov. 11, 1952 |

FOREIGN PATENTS

| | | |
|---|---|---|
| 619,746 | Great Britain | Mar. 14, 1949 |
| 723,400 | Great Britain | Feb. 9, 1955 |
| 1,101,379 | France | Apr. 20, 1955 |
| 128,532 | Switzerland | Nov. 1, 1928 |